United States Patent [19]

Thörmer et al.

[11] Patent Number: 5,416,167

[45] Date of Patent: May 16, 1995

[54] VULCANIZABLE RUBBER COMPOSITIONS CONTAINING SALTS OF PARTIAL CARBOXYLIC ACID ESTERS

[75] Inventors: Joachim Thörmer, Leverkusen; Thomas Scholl, Bergisch Gladbach; Hans-Wilhelm Engels, Kerpen, all of Germany

[73] Assignee: Bayer Aktiengesellschaft, Leverkusen, Germany

[21] Appl. No.: 237,274

[22] Filed: May 3, 1994

Related U.S. Application Data

[63] Continuation-in-part of Ser. No. 2,117, Jan. 4, 1993, abandoned, which is a continuation of Ser. No. 763,996, Sep. 23, 1991, abandoned, and a continuation-in-part of Ser. No. 1,566, Jan. 6, 1993, abandoned.

[30] Foreign Application Priority Data

Oct. 5, 1990 [DE] Germany .................. 40 31 566.5
Jan. 16, 1992 [DE] Germany .................. 42 00 907.3

[51] Int. Cl.⁶ .......................... C08F 8/34; C08C 19/20
[52] U.S. Cl. .............................. 525/329.3; 525/330.9; 525/332.6; 525/346; 525/349; 525/352

[58] Field of Search ............... 525/330.9, 331.7, 331.8, 525/332.5, 332.6

[56] References Cited

U.S. PATENT DOCUMENTS

| | | | |
|---|---|---|---|
| 2,360,896 | 10/1944 | Sarbach . | |
| 2,394,815 | 9/1946 | Soday . | |
| 2,561,524 | 7/1951 | Massie | 525/346 |
| 3,591,541 | 7/1971 | Athey | 524/773 |
| 3,787,341 | 1/1974 | Aron | 524/400 |
| 4,529,766 | 7/1985 | Starmer | 525/346 |

FOREIGN PATENT DOCUMENTS

| | | |
|---|---|---|
| 0386499 | 9/1990 | European Pat. Off. . |
| 0479083 | 4/1992 | European Pat. Off. . |
| 1092175 | 11/1967 | United Kingdom . |
| 1302360 | 1/1973 | United Kingdom . |

*Primary Examiner*—Christopher Henderson
*Attorney, Agent, or Firm*—Connolly and Hutz

[57] ABSTRACT

Vulcanizable rubber compositions are disclosed which contain partial polycarboxylic acid esters or their salts. Vulcanizates obtained from the compositions are readily processible and are found to have reduced compression set and high tension values, in particular after ageing by heat.

10 Claims, No Drawings

VULCANIZABLE RUBBER COMPOSITIONS CONTAINING SALTS OF PARTIAL CARBOXYLIC ACID ESTERS

This application is a continuation-in-part of Ser. No. 002,117, filed Jan. 4, 1993 now abandoned, which is a continuation of Ser. No. 763,996, filed Sep. 23, 1991, and is also a continuation-in-part of Ser. No. 001,566, filed Jan. 6, 1993 now abandoned.

FIELD OF THE INVENTION

The invention relates to vulcanizable rubber compositions which contain sulphur, accelerators such as thiurams and thiazoles or combinations thereof, and partial polycarboxylic acid esters or salts thereof. In addition, the compositions may contain the usual additives known for use in vulcanizable rubber. The invention further relates to a process for the preparation of such rubber compositions and to the use of the rubber compositions for producing vulcanizates.

The rubber compositions of the invention are preferably based on a rubber which has a low $C=C$ double bond content, such as EPDM, butyl or nitrile rubber, or a rubber selected from natural rubber, polychloroprene, polybutadiene, polyisoprene, styrene/butadiene copolymers, butadiene/olefin copolymers, acrylonitrile/diene copolymers or acrylic ester/diene copolymers.

BACKGROUND OF THE INVENTION

Vulcanization accelerators are substances which shorten the vulcanization time or enable vulcanization to be carried out at a lower temperature. See, Ullmanns Encyclopädie der Technischen Chemie, 3rd Edition, Urban & Schwarzenberg, Munich-Berlin 1957, pages 383 et seq. Additional accelerators are sometimes used to develop full activity. Organic or inorganic activators can also be added. The inorganic activators commonly used are metal oxides, of which zinc oxide is particularly suitable.

So-called "EV-Systems" ("EV"=efficient vulcanization) are known for sulphur vulcanization and the vulcanization accelerators used in these systems are in most cases thiuramic compounds such as tetraalkyl thiuramic monosulphides (e.g. tetramethyl thiuramic monosulphide), tetraalkyl thiuramic tetrasulphides (e.g. tetramethyl thiuramic tetrasulphide) and, preferably, tetraalkyl thiuramic disulphides (e.g. tetramethyl thiuramic disulphide, referred to herein as "TMTD"). These thiuramic compounds have also been referred to as "ultra accelerators" on account of their excellent effect; in particular, they give rise to good hot air resistance in vulcanizates produced in their presence.

Thiuramic compounds have the property that either they, or the reaction products produced from them during vulcanization, tend to bleed, which produces undesireable deposits on the vulcanizate. The tendency to bleed depends, inter alia, on the nature of the rubber and on the concentration of the thiuramic compound. See, for example, W. Hofmann, in Gummi-Asbest-Kunststoffe 9 (1986), pages 422 et seq. The phenomenon of bleeding limits the amount by which the compression set can be increased by using larger quantities of thiuramic compound, particularly in rubbers having a low $C=C$ double bond content.

SUMMARY OF THE INVENTION

The invention relates to vulcanizable rubber compositions which comprise a vulcanizable rubber and, a vulcanizing system containing a small quantity of sulphur (optionally in the form of a sulphur donor), an accelerator (such as thiuramic accelerators with or without optional thiazole accelerators), and a partial di- or tricarboxylic acid ester or salt thereof. Vulcanizates produced from these compositions show excellent high tension values and low compression set values, in particular after high-temperature ageing at elevated temperatures. The vulcanizable compositions are readily processible.

DESCRIPTION OF THE PREFERRED EMBODIMENTS

As used in this disclosure, the term "vulcanizable rubber" will be understood to refer to all types of rubber suitable for vulcanization. Particularly preferred for purposes of the invention are rubbers having a low $C=C$ double bond content, and rubbers selected from natural rubber, polychloroprene, polybutadiene, polyisoprene, styrene/butadiene copolymers, butadiene/olefin copolymers, acrylonitrile/diene copolymers or acrylic ester/diene copolymers.

By the phrase "rubbers having a low $C=C$ double bond content" is meant rubbers which contain unsaturated $C=C$ double bonds which have been selectively but not completely hydrogenated such that bonds remain available for sulfur crosslinking. Such rubbers normally have a low degree of crosslinking, as reflected by low tension values and moderate pressure deformation residue (Druckverformungsrest or "DVR") measured by deformation under pressure in hot air or hot oil. Examples of such rubbers are EPDM, butyl rubber, and in particular, nitrile rubber.

A first particularly preferred embodiment of the invention relates to vulcanizable rubber compositions based on rubber having a low $C=C$ double bond content and containing from 0.2 to 1% by weight of sulphur; from 1 to 3.5% by weight of thiuramic accelerator; and optionally up to 2% by weight, preferably from 0.2 to 1% by weight, of thiazole accelerator; and from 0.1 to 8% by weight, preferably from 0.3 to 6% by weight, and most preferably from 0.8 to 4% by weight of the salt of a partial di- and/or tricarboxylic acid ester, the percentages being based in each case on the quantity of rubber to be vulcanized.

In the case of low $C=C$ double bond content rubbers, it has been found that, with the aid of a vulcanization promoter comprising the salt of a partial di- and/or tricarboxylic acid ester, the quantity of sulphur can be reduced without adversely influencing any essential properties of the vulcanizate. The reduced quantity of sulphur is advantageous with regard to ageing and also allows an improvement in the covulcanization of rubbers having a low content of double bonds with diene rubbers, such as, for example, co-vulcanization of partially-hydrogenated NBR with normal NBR.

Rubbers with a low $C=C$ double bond content preferably have iodine numbers of from 2 to 35, preferably from 3 to 30, in particular from 5 to 25. Determination of the iodine numbers is generally carried out by the addition of iodochloride in glacial acetic acid according to Wijs, DIN 53 241, Part 1. The iodine number defines the quantity of iodine in grams which is chemically bound by 100 g of substance. The preferred rubbers EPDM, butyl rubber and hydrogenated nitrile rubber meet this description. The rubbers preferably have glass transition temperatures below 0° C., in particular below −10° C.

As known in the art, the term "EPDM" stands for ethylene/propylene/diene terpolymers. EPDMs comprise rubbers in which the ratio by weight of ethylene to propylene groups is in the range of from 40:60 to 65:35 and which may contain from 1 to 20 C=C double bonds per 100 carbon atoms. The following are examples of suitable diene monomers in the EPDM: conjugated dienes, e.g. isoprene and butadiene-(1,3), and non-conjugated dienes having 5 to 25 carbon atoms, e.g. 1,4-pentadiene, 1,4-hexadiene, 1,5-hexadiene, 2,5-dimethyl-1,5-hexadiene and 1,4-octadiene; cyclic dienes, e.g. cyclopentadiene, cyclohexadiene, cyclooctadiene and dicyclopentadiene; alkylidene and alkenyl norbornenes, e.g. 5-ethylidene-2-norbornene, 5-butylidene-2-norbornene, 2-methallyl-5-norbornene, 2-isopropenyl-5-norbornene and tricycloidenes. The non-conjugated dienes, hexadiene-(1,5), ethylidene norbornene and dicyclopentadiene, are preferred. The diene content of the EPDM is preferably from 0.5 to 10% by weight, based on the EPDM. EPDM rubbers of this type are known and are described, for example, in DE-OS 2 808 709.

The term "butyl rubber" as used herein refers to isobutene copolymers of from 95 to 99.5% by weight, preferably from 97.5 to 99.5% by weight, of isobutene and from 0.5 to 5% by weight, preferably from 0.5 to 2.5% by weight, of copolymerizable diene, e.g. butadiene, dimethylbutadiene, pentadiene-(1,3) and particularly isoprene. Butyl rubber is produced almost exclusively as an isobutene/isoprene copolymer on a large technical scale by cationic solution polymerization at a low temperature, as disclosed in Kirk-Othmer, Encyclopedia of Chemical Technology, 2nd Edition, Vol. 7, p. 688, Interscience Publisher, New York-London-Sydney (1965) and Winnacker-Küchler, Chemische Technologie, 4th Edition, Vol. 6, pp. 550–555, publishers Carl Hanser Verlag, Munich-Vienna (1962).

The preferred nitrile rubbers are hydrogenated nitrile rubbers which are based on butadiene/acrylonitrile copolymers having a copolymerized acrylonitrile content of from 5 to 60% by weight, preferably from 10 to 50% by weight. "Hydrogenated" means in this context that from 90 to 99%, preferably from 95 to 98.5%, and in particular from 96 to 98.5% of the C=C double bonds which are capable of being hydrogenated are hydrogenated. The degree of hydrogenation may be determined by IR spectroscopy. The hydrogenation of nitrile rubber is well known in the art, as shown by the following: U.S. Pat. No. 3,700,637; DE-OS 25 39 132; DE-OS 30 46 008; DE-OS 30 46 251; DE-OS 32 27 650; and DE-OS 33 29 974; EP-A 111 412; and FR-PS 2 540 503. Hydrogenated nitrile rubber is distinguished by its comparatively high resistance to oxidation.

In a further preferred embodiment, the invention relates to vulcanizable rubber compositions based on natural rubber, polychloroprene, polybutadiene, polyisoprene, styrene/butadiene copolymers, butadiene/olefin copolymers, acrylonitrile/diene copolymers or acrylic ester/diene copolymers, and which contain from 0.1 to 2% by weight of sulphur, optionally in the form of sulphur donors; from 1 to 4.5% by weight of a vulcanization accelerator; and from 0.5 to 6% by weight, preferably from 1 to 4% by weight, in particular from 1 to 3% by weight, of a partial polycarboxylic acid ester or its salts, the percentages by weight being based on the quantity of rubber used.

The rubbers used in this embodiment of the invention are known in the art and are described, for example, in "Nitrilkautschuk" by W. Hofmann, Berliner Union Stuttgart 1965, and in "Synthetischer Kautschuk" in Ullmann's Encyclopädie der Technischen Chemie, 4th Edition, Vol. 13 (1977), published by Verlag Chemie, Weinheim. The rubbers may also be used as mixtures of various rubbers.

For the process aspects of the invention, the rubbers used should preferably have a Mooney viscosity (measured according to DIN 53 523) of 10 to 150, preferably 25 to 80, (ML 1+4)100° C.

Accelerators used in the vulcanizable compositions of the invention are preferably thiuramic accelerators and/or thiazole accelerators. In the case of low C=C rubbers, it is preferred to use a thiuramic accelerator with or without an additional thiazole accelerator also being present. All of the various accelerators may be used either singly or as mixtures.

The preferred thiuramic accelerators include, for example, the tetraalkylthiuramic mono- and poly- sulphides in which the alkyl groups generally have 1 to 4, preferably 1 or 2 carbon atoms, but the substituents may also be cycloaliphatic, aromatic or araliphatic.

Preferred thiazole accelerators include 2-mercaptobenzothiazole, dibenzothiazyl-disulphide, benzothiazyl-2-cyclohexylsulphenamide (CBS), benzothiazyl-2-tert.-butylsulphenamide (TBBS), N-morpholinothio-2-benzothiazole (MBS), benzothiazyl-2-diisopropylsulphenamide (DIBS), benzothiazyl-2-tert.-amylsulphenamide (AMZ), benzothiazyl-dicyclohexylsulphena (DCBS) and morpholino-thiocarbonyl-sulphenomorpholide (OTOS).

The accelerators are present in effective amounts. Ranges by weight which are currently preferred are, in the case of low C=C bond rubber, from 1 to 3.5% of thiuramic accelerator and optionally up to 2% by weight of thiazole accelerator. In the case of the other mentioned rubbers, thiurams are preferably present in quantities of 1 to 3.5% by weight, preferably to 2.5% by weight (based on rubber), and thiazoles are preferably present in quantities of 0.5 to 3%, preferably 0.5 to 2%, by weight (based on rubber).

A key aspect of the invention is to provide in the vulcanizable rubber composition an effective amount of a partial polycarboxylic acid ester or its salt. Salts are preferred, most preferably the zinc salts. However, the free partial polycarboxylic acid esters themselves may be used when the compositions contain reactive metal oxides.

The partial polycarboxylic acid esters and their salts used as vulcanization promoters are preferably partial di- and tricarboxylic acid esters (the semiesters in the case of dicarboxylic acid esters and the diesters in the case of tricarboxylic acid esters). They include the esterification products of aliphatic dicarboxylic acids, in particular those having 4 to 10 carbon atoms (preferably adipic, acid succinic acid, or glutaric acid), of cycloaliphatic $C_8$–$C_{12}$-dicarboxylic acids (e.g. tetrahydrophthalic acid, hexahydrophthalic acid), of aliphatic $C_6$–$C_{12}$-tricarboxylic acids (e.g. citric acid) , and of $C_8$–$C_{14}$ -benzene-di- and tri-carboxylic acids (phthalic acid, isophthalic acid, terephthalic acid, trimesic acid, trimellitic acid) with $C_1$–$C_{18}$, preferably $C_4$–$C_{18}$ alcohols. The alcohol components may be aliphatic, cycloaliphatic, araliphatic or aromatic. They may contain (cyclo)olefinic C=C double bonds as well as halogen substituents, e.g. chlorine substituents, and they may be straight chain or branched. Preferred alcohol components include methanol, isopropanol, n-, iso- and tert.-butanol, hexanol, octanol, decanol, dodecanol, stearyl alcohol, cyclohexanol, benzyl alcohol, phenols. Succinic acid monooctyl ester, and glutaric acid monobutyl ester and monooctyl ester are particularly preferred.

The cations of the salts of partial esters to be used according to the invention are preferably derived from alkali metals and alkaline earth metals and zinc, the zinc salts being particularly preferred.

In addition, the vulcanizable compositions may contain other substances commonly employed in rubber vulcanization in various amounts.

Vulcanization auxiliaries and, if required, activators, fillers such as carbon black, plasticizers, anti-ageing substances and/or processing auxiliaries may be added to the rubbers in desired quantities before vulcanization.

The most important inorganic activators are the metal oxides, in particular zinc oxide. Magnesium oxide or calcium hydroxide is also used in individual cases.

The processing auxiliaries used may be, for example, fatty acids, e.g. stearic acid.

According to the process aspect of the invention, mixing of the components is carried out in conventional mixing apparatus.

The preferred mixing apparatus are kneaders, rollers, internal mixers and mixing extruders known in the rubber industry, which generally operate with shear rates of from 1 to 1000 sec$^{-1}$, preferably from 1 to 200 sec$^{-1}$.

The invention further relates to the preparation of the rubber compositions according to the invention by mixing the components, the required "mass temperature" being obtained by the temperature of the cooling water or the speed of rotation or the degree of filling, depending on the particular mixing apparatus.

Vulcanization may be carried out at temperatures from 100 to 200° C., preferably from 120° to 180° C., optionally under a pressure of from 10 to 200 bar.

The excellent vulcanization properties of the rubber compositions, in particular the compression sets and hot air ageing, are generally obtained without tempering but may often be improved by tempering.

The vulcanizates prepared from the vulcanizable compositions of the invention find utility as follows.

When using low C=C bond content rubber, the vulcanizates are excellent materials for transmission belts or toothed belts, for which their high recovery capacity is a great advantage. They also have excellent properties as sealing materials of all kinds and may be used for the inner or outer layers of tubes. They may also be used for rubberizing textiles, for lining cavities, as insulating materials and sheaths for cables, and for production of friction linings.

The vulcanizates obtained using other rubbers are suitable for all purposes in which mechanical properties, compression set, recovery power, and resistance to hot air are important. This applies to products used in the petroleum industry, e.g. seals, as well as to products of the motor vehicle industry, e.g. products under the bonnet as well as seals, hoses, membranes, rubber-metal parts, buffers and braking systems and to products of mechanical engineering, rollers and drums. These vulcanizates are also useful in the latex field but in that case special rules must be observed for processing, as described, for example, in "Vulkanisation und Vulkanisations-hilfsmittel" by W. Hofmann (published by Bayer AG, Leverkusen (1965)), pages 123 et seq.

Currently preferred embodiments of the invention will be shown by reference to the following Examples, which are provided as illustration and not as limiting the scope of the invention.

Examples 1–3 (Low C=C Bond Content Rubber)

The rubber used for Examples 1–3 was a hydrogenated acrylonitrile/butadiene copolymer having an acrylonitrile content of 33.7% by weight, a degree of hydrogenation of 96.4%, based on the C=C double bonds originally present, and a Mooney viscosity of 67 (ML 1+4) 100° C. (®Therban 1707 S of Bayer AG).

100 parts of rubber were masticated in a laboratory kneader at 50° C. for 0.5 minutes and 0.51 parts of sulphur, 1 part of stearic acid, 2 parts of zinc oxide, 1 part of octylated diphenylamine (®Vulkanox OCD of Bayer AG), 0.4 parts of zinc methylmercaptobenzimidazole (®Vulkanox ZMB2 of Bayer AG), 45 parts of carbon black (Corax N550 of Degussa/Wesseling) and varying quantities (see Table I) of the zinc salt of succinic acid octyl semiester were then added and the mixture was kneaded until homogeneous (4.5 minutes).

After the rubber mass had been cooled to about 100° C. on a roller, an accelerator system consisting of 2 parts of tetramethylthiuramic disulphide (®Vulkacit Thiuram C of Bayer AG) and 0.5 parts of benzothiazyl-2-cyclohexyl-sulphenamide (®Vulkacit CZ of Bayer AG) were added.

The properties of the resulting mixtures are listed in Table I as follows:

TABLE I

|  | Ex. 1 | Ex. 2 | Ex. 3 |
| --- | --- | --- | --- |
| Therban 1707 S | 100 | 100 | 100 |
| Sulphur | 0.51 | 0.51 | 0.51 |
| Vulkanox OCD | 1 | 1 | 1 |
| Vulkanox ZMB2 | 0.4 | 0.4 | 0.4 |
| Carbon black N 550 | 45 | 45 | 45 |
| Zinc oxide | 5 | 5 | 5 |
| Stearic acid | 0.5 | 0.5 | 0.5 |
| Vulkacit Thiuram C | 2 | 2 | 2 |
| Vulkacit CZ | 0.5 | 0.5 | 0.5 |
| Zinc succinic acid octyl semiester | — | 1.5 | 3 |
| Mooney viscosity ML1 + 4/120° C. | 78 | 76 | 76 |
| Mooney-Scorch at 130° C. (min) | 18.5 | 18.6 | 17.3 |
| Vulkameter 160° C. | | | |
| $t_{10}$ (min) | 4.5 | 4.8 | 4.8 |
| $t_{80}$ (min) | 7.9 | 8.2 | 9.0 |
| Fmin (N) | 2.1 | 2.1 | 2.0 |
| Fmax (N) | 58.4 | 58.6 | 57.6 |
| Vulcanization 30 min./160° C. (S2 rods, DIN 53502 + 53504) | | | |
| Tensile strength (MPa) | 29.7 | 29.8 | 30.1 |
| Elongation at break (%) | 490 | 480 | 480 |
| Tension $S_{100}$ (MPa) | 3.8 | 4.2 | 4.3 |
| Shore hardness | 72 | 72 | 73 |
| C.S.*, Probek. II 70 h/100° C. | 59.2 | 47.7 | 44.4 |
| C.S.*, Probek. I, 70 h/100° C. with temp. 6 h/150° C. (%) | 44.8 | 30.3 | 25.2 |
| relative elongation (%) after hot air ageing (10 days/150° C.) | 41 | 54 | 52 |

*Compression set

Examples 4–8

A butadiene/acrylonitrile copolymer having a Mooney viscosity of 45 (Perbunan N 3307 NS of Bayer AG) was used as the rubber in Examples 4–8.

Preparation of the rubber composition was carried out as follows:

The polymer was first mixed with the required quantity of sulphur on laboratory rollers at a roller temperature of 40° C. This batch was then mixed with the other components and the zinc semiester salts but without the accelerator in a laboratory kneader for 3.5 minutes at a cooling water temperature of 40° C; a mass temperature of about 135° C. was reached. After the mass had been stripped off, it was cooled down to 100 °–105° C. and the accelerators were added. The composition was again stripped off after one minute and the apparatus was emptied after ½ minute.

The vulcanizates were produced in a press as shown in Table II.

TABLE II

|  | Ex. 4 | Ex. 5 | Ex. 6 | Ex. 7 | Ex. 8 |
|---|---|---|---|---|---|
| NBR[1] | 100 | 100 | 100 | 100 | 100 |
| Sulphur[2] | 0.3 | 0.3 | 0.3 | 0.2 | 0.2 |
| Stearic acid | 1.0 | 1.0 | 1.0 | 1.0 | 1.0 |
| Zinc oxide | 5.0 | 5.0 | 5.0 | 5.0 | 5.0 |
| Carbon black N 550 | 45 | 45 | 45 | 45 | 45 |
| Styrenised diphenylamine[4] | 1.5 | 1.5 | 1.5 | 1.5 | 1.5 |
| Zinc salt of mercaptobenzimidazole[5] | 3.0 | 3.0 | 3.0 | 3.0 | 3.0 |
| TMTD[6] | 2.5 | 2.5 | 2.5 | 2.5 | 2.5 |
| CBS[7] | 2.0 | 2.0 | 2.0 | 2.0 | 2.0 |
| Zinc salt of succinic acid octyl semiester | — | 2 | — | — | — |
| Zinc salt of glutaric acid octyl semiester | — | — | 2 | — | 2 |
| Mooney viscosity ML 1 + 4/100° C. | 77 | 77 | 78 | 77 | 77 |
| Vulcanization 20 minutes/160° C., 2 mm plates (S2-rods) DIN 53 502 and 53 504) | | | | | |
| Tensile strength (MPa) | 25 | 24 | 23 | 25 | 23 |
| Elongation at break (%) | 527 | 507 | 498 | 592 | 516 |
| Modulus $M_{100}$ (MPa) | 3.2 | 3.3 | 3.3 | 3.0 | 3.0 |
| Modulus $M_{300}$ (MPa) | 14.3 | 14.0 | 14.0 | 12.7 | 12.5 |
| Hardness Shore A | 66 | 68 | 68 | 67 | 68 |
| Compression sets according to DIN 53 517 Sample body II: | | | | | |
| 70 h/100° C. (%) | 18.5 | 17.5 | 16.5 | 21.5 | 19.0 |
| 70 h/125° C. (%) | 28.0 | 27.5 | 27.0 | 33.0 | 30.5 |
| Hot air ageing at 135° C. in cellular oven (preservation of tensile strength F and elongation at break D in % of the initial values): | | | | | |
| $F_{rel}$ after 10 d (%) | 78 | 102 | 99 | 80 | 102 |
| $D_{rel}$ after 10 d (%) | 25 | 37 | 39 | 22 | 45 |

Key to TABLE II:
[1] Perbunan N 3307 NS of Bayer AG
[2] Spider-Brand-Sulphur (insoluble sulphur)
[3] Zinc oxide RS of Bayer AG
[4] Vulkanox DDA of Bayer AG
[5] Vulkanox ZMB 2 of Bayer AG
[6] Vulkacit Thiuram C of Bayer AG
[7] Vulkacit CZ of Bayer AG

What is claimed is:

1. A vulcanizable rubber composition which comprises a vulcanizable rubber, sulfur or sulfur donor, at least one accelerator, and a zinc salt of a partial ester of a polycarboxylic acid, the partial ester being selected from the semi-ester of an aliphatic $C_4$-$C_{10}$ dicarboxylic acid, tetrahydrophthalic acid or hexahydrophthalic acid, or a $C_8$-$C_{14}$ benzene dicarboxylic acid or from the diester of an aliphatic $C_6$-$C_{12}$ tricarboxylic acid, in an amount effective to improve the compression set and hot air aging properties of the composition when vulcanized.

2. The composition of claim 1, wherein the rubber is selected from low C=C double bond content rubber, natural rubber, polychloroprene, polybutadiene, polyisoprene, styrene/butadiene copolymers, butadiene/olefin copolymers, acrylonitrile/diene copolymers or acrylic ester/diene copolymers.

3. The composition of claim 1, wherein the low C=C bond content rubber is EPDM rubber, butyl rubber, or hydrogenated nitrile rubber.

4. The composition of claim 1 which contains a thiuramic and optionally a thiazole accelerator.

5. The composition of claim 1, which contains as rubber a rubber having a low C=C double bond content, from 0.2 to 1% sulfur, from 1 to 3.5% of thiuramic accelerator, optionally from 0.2 to 1% of thiazole accelerator, and from 0.1 to 8% of said zinc salt of a partial ester of a polycarboxylic acid, the percentages being based on weight of rubber.

6. The composition of claim 5, wherein the partial ester is the esterification product of adipic acid, glutaric acid or succinic acid with an alcohol having 1–18 C atoms.

7. The composition of claim 6, containing as salt of a partial ester the zinc salt of succinic acid octyl ester.

8. The composition of claim 1, wherein the vulcanizable rubber is selected from the group consisting of natural rubber, polychloroprene, polybutadiene, polyisoprene, styrene/butadiene copolymers, butadiene/olefin copolymers, acrylonitrile/diene copolymers or acrylic ester/diene copolymers, and which contains 0.1 to 2% by weight sulfur, from 1 to 4.5% by weight vulcanization accelerators, and from 0.5 to 6% by weight of said zinc salt of a partial ester of a polycarboxylic acid, the percentages being based on weight of rubber.

9. The composition of claim 8 wherein the acid component of the partial ester is an aliphatic dicarboxylic acid.

10. The composition of claim 8, wherein the salts are zinc salts of succinic acid monooctyl ester, or of glutaric acid monobutyl ester or monooctyl ester.

* * * * *